US006963899B1

United States Patent
(12) United States Patent
Fernandez et al.

(10) Patent No.: US 6,963,899 B1
(45) Date of Patent: Nov. 8, 2005

(54) ADAPTIVE DIRECT TRANSACTION FOR NETWORK CLIENT GROUP

(76) Inventors: Dennis S. Fernandez, 1175 Osborn Ave., Atherton, CA (US) 94027; Irene Hu, 1240 Avon St., Belmont, CA (US) 94002

( * ) Notice: Subject to any disclaimer, the term of this patent is extended or adjusted under 35 U.S.C. 154(b) by 16 days.

(21) Appl. No.: 09/952,285

(22) Filed: Sep. 14, 2001

Related U.S. Application Data

(62) Division of application No. 09/145,167, filed on Sep. 1, 1998.

(51) Int. Cl.[7] .............................................. G06F 15/16
(52) U.S. Cl. ...................... 709/203; 709/205; 709/218; 709/223; 707/1; 707/3; 707/10; 705/14; 705/30
(58) Field of Search ............................... 709/203, 205, 709/218, 223; 707/1, 3, 10; 701/213; 705/14, 705/30

(56) References Cited

U.S. PATENT DOCUMENTS

| | | | | | |
|---|---|---|---|---|---|
| 4,982,346 | A | | 1/1991 | Girouard et al. | |
| 5,390,238 | A | | 2/1995 | Kirk et al. | |
| 5,418,526 | A | | 5/1995 | Crawford | |
| 5,441,047 | A | | 8/1995 | David et al. | |
| 5,459,660 | A | | 10/1995 | Berra | |
| 5,481,542 | A | | 1/1996 | Longston et al. | |
| 5,556,749 | A | | 9/1996 | Mitsuhashi et al. | |
| 5,588,148 | A | * | 12/1996 | Landis et al. | 707/1 |
| 5,632,041 | A | | 5/1997 | Peterson et al. | |
| 5,701,419 | A | | 12/1997 | McConnell | |
| 5,706,498 | A | | 1/1998 | Fujimiya et al. | |
| 5,708,780 | A | * | 1/1998 | Levergood et al. | 709/218 |
| 5,724,070 | A | | 3/1998 | Denninghoff et al. | |
| 5,740,549 | A | * | 4/1998 | Reilly et al. | 705/14 |
| 5,745,681 | A | | 4/1998 | Levine et al. | |
| 5,764,923 | A | | 6/1998 | Tallman et al. | |
| 5,774,357 | A | | 6/1998 | Hoffberg et al. | |
| 5,867,799 | A | * | 2/1999 | Lang et al. | 707/1 |
| 5,933,827 | A | * | 8/1999 | Cole et al. | 707/10 |
| 6,131,067 | A | * | 10/2000 | Girerd et al. | 701/213 |
| 6,161,125 | A | * | 12/2000 | Traversat et al. | 709/203 |
| 6,195,654 | B1 | * | 2/2001 | Wachtel | 707/3 |
| 6,308,175 | B1 | * | 10/2001 | Lang et al. | 707/10 |
| 6,314,420 | B1 | * | 11/2001 | Lang et al. | 707/3 |
| 6,363,421 | B2 | * | 3/2002 | Barker et al. | 709/223 |
| 6,374,290 | B1 | * | 4/2002 | Scharber et al. | 709/205 |
| 6,807,558 | B1 | * | 10/2004 | Hassett et al. | 709/203 |

* cited by examiner

*Primary Examiner*—Ario Etienne
*Assistant Examiner*—ThuHa Nguyen
(74) *Attorney, Agent, or Firm*—Fernandez & Associates LLP

(57) ABSTRACT

Internet-based software and associated database provide group analysis overlay to monitor client-server web traffic and provide direct marketing to client group. Client car, patient, office or school sensor and interface provides overlay attribute for database comparison to classify usage pattern, location, timing, or family for targeted messaging for enhanced service from server source. Database group registry tracks client classification and provides adaptive context mapping according to set attribute relative to targeted on-line transaction.

18 Claims, 6 Drawing Sheets

ADAPTIVE DIRECT TRANSACTION FOR NETWORK CLIENT GROUP

RELATED U.S. APPLICATION DATA

This Application is a divisional of U.S. patent application Ser. No. 09/145,167, entitled "ADAPTIVE DIRECT TRANSACTION FOR NETWORK CLIENT GROUP" by FERNANDEZ, et al., filed on Sep. 1, 1998.

FIELD OF INVENTION

Invention relates to networked computer applications, particularly to distributed client-server software for adaptive direct group transaction.

BACKGROUND OF INVENTION

With the explosive growth of the Internet and its associated World-Wide Web, various computer programs have been developed for distributed applications between client and server processors interconnected through local and/or wide area networks. In particular, web-based software are provided variously for promoting, managing or otherwise transacting business on-line. Thus, such electronic commerce applications are provided to facilitate more efficient marketing and distribution of goods and services. However, prior-art approaches at facilitating on-line commerce are limited, particularly with respect to enabling direct marketing, especially for multiple targets or client groups.

SUMMARY OF INVENTION

Invention resides in software for directing on-line messages to classified client set adaptively according to monitored set characteristics. Memory stores set data associated with historically stored, currently measured, or preferred network configuration, on-line traffic, location, schedule, or affiliation. Clients are classified into sets per criteria for contextual mapping of particular sets to corresponding targeted on-line messages. Client sensor interface provides mobile location, medical condition, or other attribute for adaptive classification of client into sets by comparing attribute to set groupings. Updated client classification provides adaptive context mapping of sets to directed transactions.

DETAILED DESCRIPTION OF PREFERRED EMBODIMENTS

Figure 1:
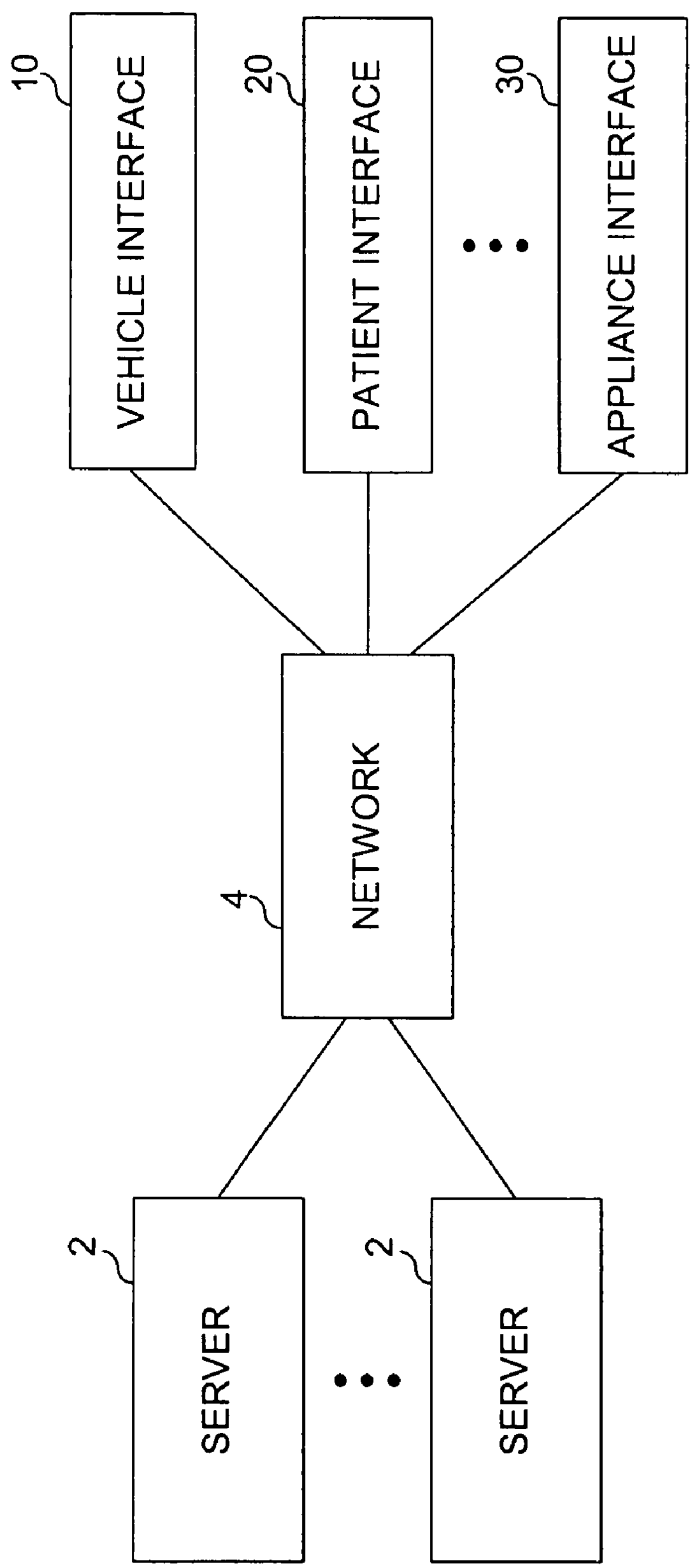
FIG. 1 is general block diagram for network system implementing present invention.

FIG. 1 block diagram shows network system 4 having one or more server processors or nodes 2 and one or more client processors or nodes 10, 20, 30, coupled thereto preferably according to standard Internet Protocol or other conventional digital networking and data communications scheme, which publicly available specifications are hereby referenced, as appropriate.

Preferably, client 10 represents network interface for vehicular or other mobile processing application, client 20 represents network interface for medical or other personal processing application, and client 30 represents network interface for appliance or other embedded processing application.

It is contemplated herein that network 4 may be embodied in conventional and/or proprietary, wired and/or wireless, hardware and/or software, integrated and/or modular means for sending and receiving digital data and/or electronic signals between processors, nodes or other addressable network sites coupled thereto. Moreover, it is contemplated that server or client processing functionality may be embodied in one or more processing machines or devices, and a single processing machine or device may perform functionality of multiple server and/or client processors.

Figure 2:
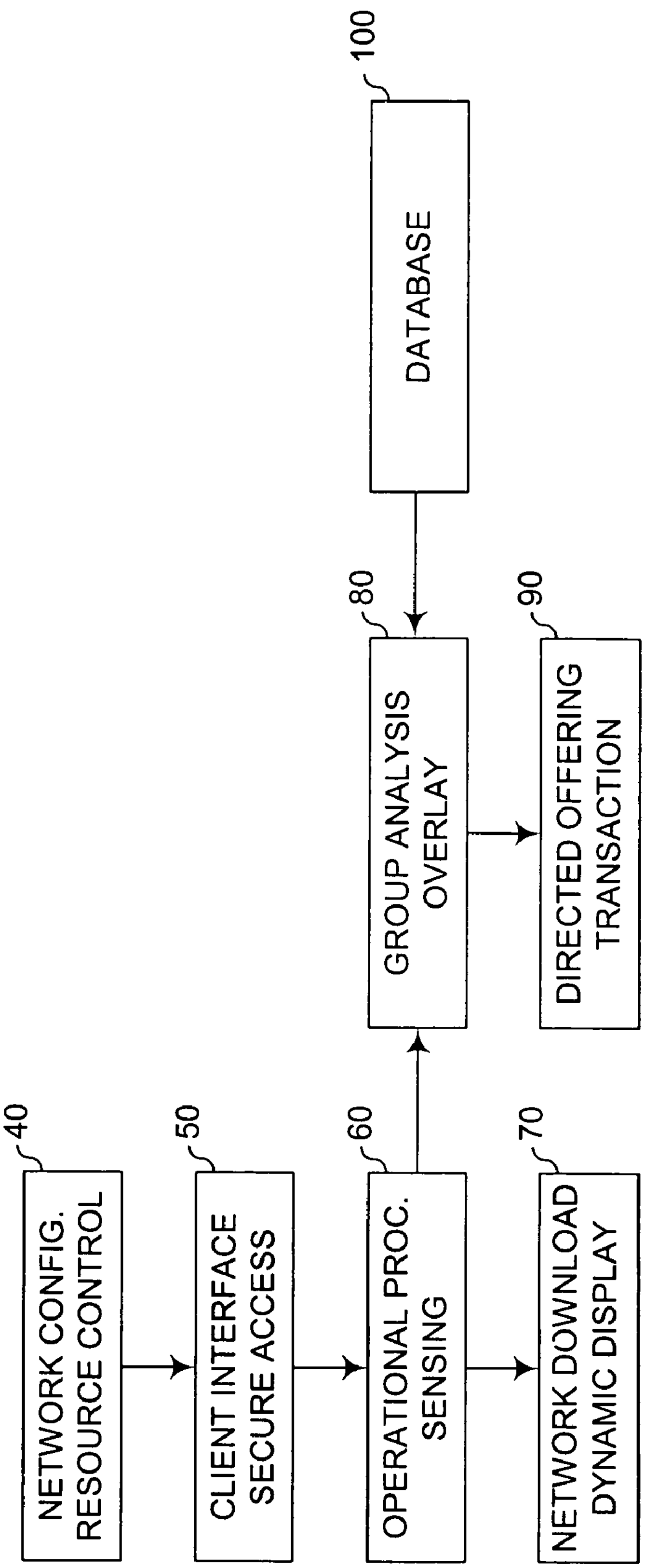
FIG. 2 is logic flow diagram of operational methodology for implementing present invention.

FIG. 2 flow chart shows process for network configuration and resource control 40, client interface and secure access 50, operational processing and sensing 60, network download and dynamic display 70, group analysis overlay 80, directed offering and transaction 90, and database access 100.

In accordance with present invention, network 4, including server(s) 2 and client(s) 10, 20, 30 employ software and/or other functionally equivalent firmware, hardware, or electronics for directing or targeting on-line messages or electronic signals to selected or classified client set or group adaptively or dynamically according to monitored or specified set characteristics or attributes. Preferably, such software functionality is implemented using embedded or real-time operating (RTOS) code convention, JAVA, C/C++, Windows/CE, or other equivalent digital signal processing instruction scheme, according to operational definition described herein.

Such software or functionality may use or cooperate for read/write operations with one or more digital memory or functionally equivalent network-accessible electronic storage to store data or attribute signals about one or more client 10, 20, 30 associated with previously stored, currently measured, or preferred network or node configuration, on-line network traffic, actual location, schedule events, or subscribed or qualified affiliation.

Preferably, clients 10, 20, 30 are classified into or otherwise associated with sets, super-sets, sub-sets, groups, super-groups, sub-groups, or other hierarchical category according to pre-specified or dynamically defined criteria for qualification therein. Particular set or sets may be logically mapped, assigned contextually or otherwise related to one or more corresponding targeted on-line message or electronic network signals, as described herein. In particular, client sensor interface may provide various monitored still images, live video, audio, states, data or attribute signals representative thereof, such as mobile location, medical condition, or other detectable attribute for adaptive or responsive classification of subject client into set(s) by comparing attribute and classifying appropriately into set groupings. For example, sensor may include one or more keyboard, screen or mouse entry, microphone, digital imaging or video camera, or position locator or navigational electronics, such as Global Positioning Satellite system (GPS) receiver functionality to provide certain dimensional and temporal (i.e., time and place) signals and values.

Additionally, client interface user interface is preferably implemented as dial-up or dedicated network connection web browser software, which provides secured access according to authenticated and/or encrypted user identification or messages. Optionally, user identification may be achieved by client interface determination of unique user physical or biological characteristic, such as sensor-sampled or input-verified personal genetic sequence.

Moreover, updated or modified client classifications effectively provide adaptive or dynamic context mapping of sets to directed transactions, messages, or signals representative thereof. For example, directed message, transaction or network signal may include commercial offering, application program, still image, or video stream.

Hence, during software operation of preferred implementation, one or more client attribute or signal is determined or generated initially, so that subject client may be classified in a set according to subject attribute (i.e., currently monitored or generated attribute signal); then, a message or transaction signal representative thereof is sent to clients classified in that set. Generally, subject attribute or generated signal may represent one or more monitored signals, data, or values, such as client location, elapsed or actual time, client or user entry selection, physical, mechanical, medical or other objective condition, as well as any affiliation or subscription associated with subject client.

More particularly, subject attribute value or signal may be provided by one or more client sensor, wherein such attribute is provided in digital memory or functionally equivalent electronic storage. Client may be classified by comparing the attribute with another attribute stored in memory to determine equivalence or non-equivalence, such that client is classified or not classified in the set, for example, according to pre-determined substantial similarity determined therebetween.

Additionally, a second attribute of the client may be determined, wherein the client then may be classified in another or same set according to the second attribute. Another or same message or transaction signal may be sent to one or more clients classified in the second set. Moreover, a second attribute may be determined for another client, wherein such other client is classified in the second set according to the second attribute, and a second message or transaction signal is thereby sent to clients classified in the second set.

Figure 3:
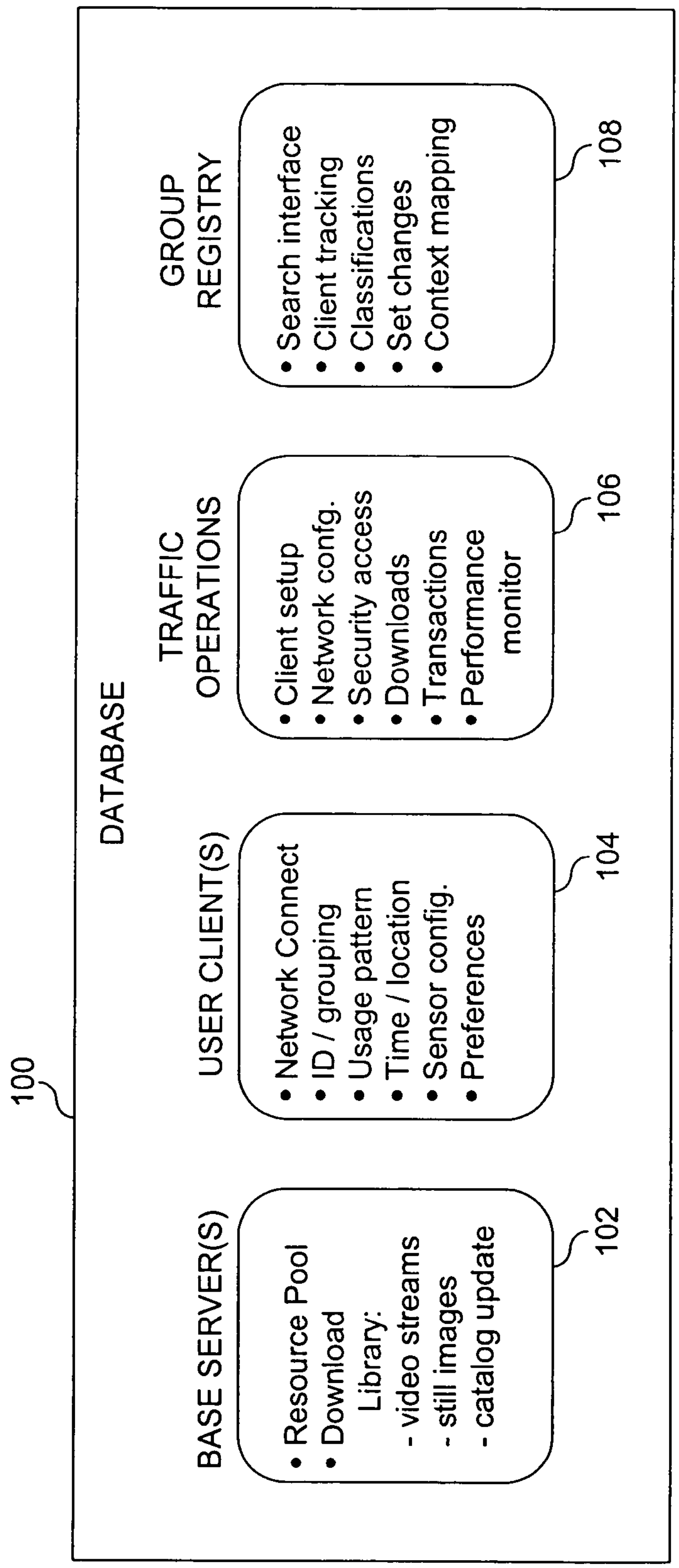
FIG. 3 is database diagram according to present invention.

FIG. 3 diagram represents database 100 of base server(s) 102, user client(s) 104, traffic operations 106, and group registry 108, which are one or more separately or collectively stored or accessible object-oriented and/or relational information modules or other networking or processing system cache or repositories, value or signals representative of functional activity associated respectively with one or more servers 2, client interfaces 10, 20 30, network 4 communications and configurations, and client set groupings, as described herein.

In particular, base server data module 102 includes electronically-accessible expert, service catalog, knowledge library, or other on-line or user self-service resource pool; and network-downloadable text, audio, still images, video clips or streams; or any update or revision thereof. User client or sensor site module 104 includes network client or server connection and configuration; client and/or group identifier or reference indicator; network usage or transaction history or pattern; monitored or sensed client attributes (e.g., time, location, temperature, available resources, etc.); client sensor configuration, status and condition, or client specified or inferred preferences.

Traffic operations or network manager module 106 includes client or sensor sites set-up sequence, configuration or log; security or authentication sequence, configuration or log; data transfer or signal transmission download or communication sequence, configuration or log; offering transaction sequence, configuration or log; and network operation or performance monitor or log. Client or user group or set registry module 108 includes group or set search interface sequence, configuration or log; user or client attribute tracking or monitoring; group or set classifications or criteria; or context mapping or other directed message association.

Figure 4:
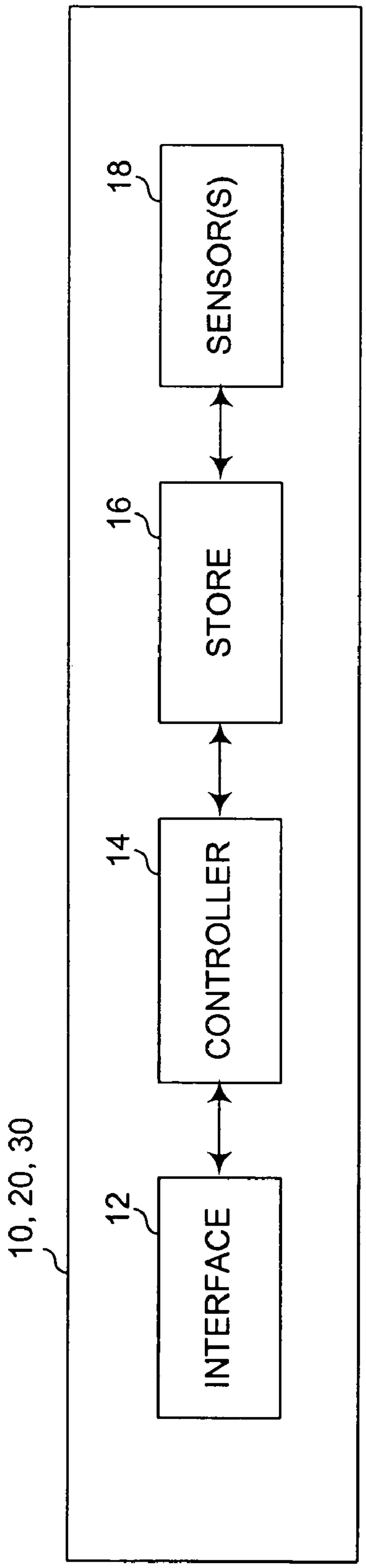
FIG. 4 is block diagram of client interface according to present invention.

FIG. 4 diagram shows client or site interface 10, 20, 30, including interface; coupling or application, controller or embedded processor; storage, cache or memory; and one or more network-accessible sensors. Such included client functionality may be provided in one or more integrated, programmable, reconfigurable, electronic devices, circuit, firmware, software and/or other equivalent implementation. Preferably controller 14 is implemented as programmed embedded digital signal processor, microprocessor, or reduced instruction set computing (RISC) microcontroller, such as commercial parts: 43001 from NEC Electronics (Santa Clara, Calif.), 4640/4650 from Integrated Device Technology (Santa Clara, Calif.), R5000/R8000/10000 from MIPS Technology (Mountain View, Calif.), PPC603/604 from IBM Microelectronics (Hopewell Junction, N.Y.) and Motorola (Austin, Tex.), 486DX4/486DX5 from Advanced Micro Devices (Austin, Tex.), PentiumPro/PentiumII from Intel (Chandler, Ariz.), UltraSPARC II/III from Sun Microsystems (Mountain View, Calif.), or Alpha 21164/21264 from Digital Equipment (Maynard, Mass.).

Generally, present embodiment may be implemented and/or performed using any digital local or wide-area network 4 wherein one or more addressable nodes (i.e., client and/or server) are coupled thereto for communication or transmission of packets, cells, frames, signals, or other electronic messages therebetween. Preferred network uses so-called Internet convention and World-Wide Web networking protocol for sending files, for example, according to specified formats, such as hypertext file transfer protocol (HTTP), universal resource locator (URL), hypertext markup language (HTML), extensible markup language (XML), transmission control protocol/Internet protocol (TCP/IP), etc. Thus, in this network arrangement, one or more servers and/or clients may remotely or locally access one or more servers coupled directly or indirectly thereto.

Initially, for functional operation of present embodiment, one or more client interface 10, 20, 30 is coupled to network 4, and such network is configured 40 wherein one or more informational expertise or data signal resources, such as provided centrally or distributedly by one or more modules 102, 104, 106, 108 in database 100.

For example, during or after initial set-up, resource pool in base server 102 may specify one or more expertise repositories or catalogs which may provide client-requested or downloadable text, audio, video, or other digital data. Moreover, during or after initial set-up, user client database 104 may be updated to indicate network connectivity and configuration between any servers and/or clients coupled thereto, as well as connectivity and configuration of any sensor or equivalent devices associated with one or more such clients. Furthermore, during or after initial set-up, user client database 104 may indicate one or more user-preferred network configuration, transaction selection, or sensor-related attribute. Additionally, during or after initial set-up, traffic operations module 106 may indicate client setup, network configuration, and security access parameters. In addition, during or after initial set-up, group registry module 108 may indicate client tracking state and client classification or grouping.

Preferably, one or more client interfaces 10, 20, 30 are configured and coupled in accordance with secure access channel and protocol 50 to network 4 to provide selectable access to one or more sensor 18 associated with particular client. Depending on client interface type, application or specific embodiment, for example, client interface 10 may serve as network interface for non-fixed pedestrian, vehicular or other moving processing site; client interface 20 may serve as network interface for personal, patient, medical or other tele-medicine computing or communications environment; or client interface 30 may serve as network interface for multimedia equipment, residential appliance, office processing equipment, or other embedded controller or local processing application.

Hence, when client-server network is configured 40 for controlling expert resource or database access, and various client interface and sensors are coupled and accessible securely 50 thereto, then one or more applications programs may execute, preferably according to client and corresponding sensor implementation type, according to present invention to enable effectively adaptive direct transaction or messaging for one or more networked client group.

Sensor input signals from one or more client sites may be received continuously, scheduled at regular times, triggered by specified alarms or conditions, selectably activated by client or server, or adaptively or proportionately increased or decreased in sensing activity according to pre-specified or associated attributes, current related activity, or specified or monitored client group or set conditions or monitored activity.

In embodiment case of vehicle client interface 10, operational processing and sensing uses one or more microprocessor or embedded controller 14 electronically to monitor, diagnose and/or control data signals, alarm or out-of-specified range condition, pre-specified states, or other objectively detectable or attributes. Preferably, such sensed signal monitoring process is achieved using one or more local or embedded processing programs or applications provided in storage 16 executable by controller 14 for real-time access of one or more sensors or other signal feedback detector coupled thereto, such as temperature, pressure, accelerometer or movement sensors, (such as commercial integrated silicon or micromachined parts: AD741X and AD781X temperature sensors from Analog Devices (Norwood, Mass.), LM80, LM56, LM75 thermal sensors from National Semiconductor (Santa Clara, Calif.), XTR106 pressure sensors from Burr-Brown (Tucson, Ariz.), MPX10/50/100/2010/210d0/2700/5010/5006/5100/5700 pressure sensors from Motorola (Phoenix, Ariz.), or 7257AT accelerometer sensor from Endevco (San Juan Capistrano, Calif.), 40PC/4000PC pressure sensor from Honeywell (Freeport, Ill.), 19(C,U)005G pressure sensor from Sensym (Milpitas, Calif.), Titan pressure sensor from Lucas Control Systems (Hampton, Va.), DMU Turbo accelerometer sensor from Crossbow Technology (San Jose, Calif.), or MAP1452/XKP1260 pressure transducers from Integrated Sensor Solutions (San Jose, Calif.)).

It is contemplated that such client sensors 18 may be implemented in automotive, trucking or other terrestrial, airborne and/or marine transport systems or subsystems, such as mechanical (e.g., internal combustion engine timing, mechanical linkage stress or strain, transmission, and related drive train monitor, vehicle braking or brake anti-locking, fuel delivery and storage, passenger restraint, emergency condition, seatbelt securement or airbag deployment, or impact detection, diagnosis and/or control thereof), and/or electrical (e.g., engine ignition, lighting, thermal cooling/heating, entertainment, communication, dispatching, or navigational appliance or device, and/or other electronic module monitor, diagnosis and/or control thereof), etc.

In embodiment case of personal or patient client interface 20, operational processing and sensing uses one or more microprocessor or embedded controller 14 electronically to monitor, diagnose and/or control data signals, alarm or out-of-specified range condition, pre-specified states, or other objectively detectable or attributes through one or more sensors or other signal feedback detector, as described herein. Preferably, such sensed signal monitoring process is achieved using one or more local or embedded processing programs or applications provided in storage 16 and executable by controller 14 for real-time access of one or more sensors or other signal feedback detector coupled thereto.

It is contemplated that such client sensors 18 may be implemented in remote clinical, biometric, ambulatory medical, consultation, monitoring or communications systems or subsystems, particularly record-forwarding, patient-communication and observation, patient vital measurements, radiograph and other diagnostic image-transmission, for various specialties, such as radiology, dental, cardiorespiratory, constitutional, dermatology, ear-nose-throat, gastrointestinal, genitourinary, gynecological, musculoskeletal, neuropsychiatric, etc.

Optionally, sensors 18 may serve to detect or identify client-provided or specified organic material, particularly by obtaining probed or receiving analyzed input of one or more genetic sequence data of deoxyribonucleic acid (DNA) or protein of subject client, for example, for subsequent database alignment and/or comparison for similarity or matching against known identifiable sequences.

In embodiment case of office, home or school appliance client interface 30, operational processing and sensing uses one or more microprocessor or embedded controller 14 electronically to monitor, diagnose and/or control data signals, alarm or out-of-specified range condition, pre-specified states, or other objectively detectable or attributes through one or more sensors or other signal feedback detector, as described herein. Preferably, such sensed signal monitoring process is achieved using one or more local or embedded processing programs or applications provided in storage 16 and executable by controller 14 for real-time access of one or more sensors or other signal feedback detector coupled thereto.

It is contemplated that such client sensors 18 may be implemented for accessing, communicating with, monitoring, and controlling operations in multimedia entertainment, home or small office automation equipment, residential appliance devices, systems or subsystems, such as digital video disk players or recorders, personal computers, printers, copiers, fax machines, digital television, set-top boxes, security monitoring and alarm, etc.

Preferably, such electronic sensor-implementing components employ controller 14 processing code to interface to network 4 for sensor and interface access, signaling and control according to communication or signaling protocol, such as universal serial bus (USB), IEEE 1394 (i.e., FireWire), or other similar comparable interface specification. For example, such preferred interface for client appliance interface 30 complies with home audio/video interoperability (HAVI) architecture, which published specification is hereby incorporated by reference.

According to application program execution during operational processing and sensing 60, as described herein, client or user input and/or output (I/O) interface is provided, particularly to deliver signal or data download from network using dynamic display mechanism 70. Informational download, such as text (e.g., ASCII or Word processor format), audio (e.g., Real Audio format), still image (e.g., joint picture experts group (JPEG), 2 or 3 dimensional format), video (e.g., moving picture experts group (MPEG), or other catalog, expertise data pool, resource files or electronic digital material, are accessed from database 100 modules 102, 104, 106, 108. Optionally, such network client interface includes web browser software, such as available commercially from Microsoft (e.g., Internet Explorer) or Netscape (e.g., Communicator/Navigator).

Figure 6:
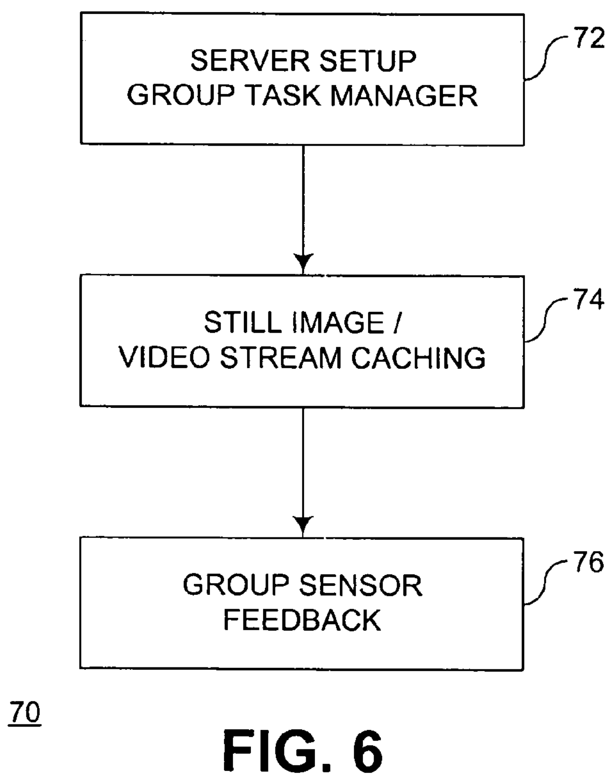
FIG. 6 is flow chart of operational steps for network download dynamic display according to present invention.

FIG. 6 flow chart shows group download display embodiment, wherein one or more servers initially setup to determine one or more clients associated with or belonging to specified sets or groups, thereby updating database client grouping 104, database registry client tracking 108, as well as any database traffic operation client setup and network configuration 106.

In particular, such determining server(s) may create and maintain current group or task manager, preferably as data table or system process to identify and monitor communications with or other network download to specified group members. Thus, based on initial client-server parameter setup, as well as subsequent updates thereto, accessing such task manager may provide effectively real-time organization of multi-member grouping data, and facilitates relatively fast informative response to authorized client or server query to determine current group definitions and members actively categorized therein. Additionally, such task manager program may serve to balance processing between group members, for example, such that directed messages or other transaction offerings are delivered more frequently or earlier to less-busy or higher-processing capacity client sites, as indicated in current database 100.

Further, display downloading scheme 70 includes faster-memory caching 74 of relatively larger data files, such as still image (e.g., .GIF, .JPG) and compressed video (e.g., MPG) files from database module download library 102. In addition, display downloading may include feedback signaling or equivalent communication 76 from one or more subject clients, which belong to common group client members, to provide accelerated current group membership indication to like group members. In this feedback-loop manner, group members may relatively quickly be alerted and display appropriate membership or non-membership status.

Preferably, network download dynamic display operations 70 provide subject server or client relatively high-resolution, flat-panel screen output with interactive multimedia capability (i.e., text, audio, still image, video, 3-D graphic or virtual media format, etc.), for example, using personal computer equipment or engineering workstation with processing encoded and compressed media signals, or interactive digital television having network-ready Internet or equivalent communications interface and applications protocol. Optionally, particular client may select to screen, block, filter or exclude from receiving one or more classes or attributes of incoming directed messages, such as undesirable commercial or immoral content.

Figure 5:
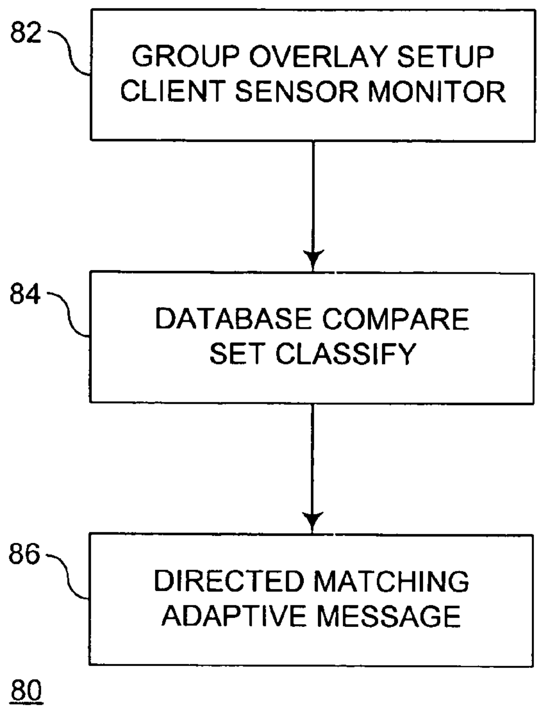
FIG. 5 is flow chart of operational steps for group analysis overlay according to present invention.

FIG. 5 flow chart shows operational steps for group analysis or system overlay thereof, according to important aspect of present invention, generally wherein Internet-based client interface 10, 20, 30 and associated database 100 effectively provide group analysis processing to monitor client-server web traffic and deliver direct marketing services to client group. As per alternative instances described herein, client car, patient, office or school sensors and interfaces provide attribute processing system overlay for database comparison to classify usage pattern, location, timing, or family for targeted messaging for enhanced service from server source. Database 100 group registry tracks client classification and provides adaptive context mapping according to set attribute relative to targeted on-line transaction.

Generally, group analysis 80 may be invoked automatically upon schedule or per directed request, thereby operating to determine groupings by comparing sensed 60 operational values with associated values stored in database 100. When group analysis 80 and subsequent directed offering transaction operations 90 are so invoked, for example, by network client or server with proper requesting authorization, preferably, one or more candidate client sites 10, 20, 30 are identified accordingly for classification. For example, in case of vehicle client interface 10, one or more clients having certain sensed or specified characteristics or other attributes, such as having certain serial or model numbers, tracked geographic location, etc., may be designated as candidate sites when considered for possible vehicle or product defect, repair, upgrade, or recall.

Initially, to perform proper group analysis, subject server 2 (or other network processor with access to database 100 and one or more candidate clients for present comparison) examines database 100, which may be implemented in one or more network-accessible data repositories, to determine 82 existence of any specified supergroups, groups, subgroups, in present network, and particularly search database modules 104, 108 recognize any such grouping which includes client to be evaluated for membership. Moreover, such subject server 2 may further search such database modules 104, 108 to determine and monitor existence of any or each sensor and characteristics thereof associated with each subject client for evaluation.

Then, database compare and set classify operations 84 are performed by subject server 2, whereby representative attributes or other sensed characteristics of candidate client(s) are logically compared to equivalent data field representations of other pre-registered or tracked clients in database 100 to determine matching or recognize substantial qualification for set groupings or non-groupings. Group registry 108 provides functional or graphical interface for searching fields for client and sensor attributes.

For example, in case of patient client interface 20, candidate patient sensed or specified attributes, such as geographical location, demographic family, race or ethnicity, medical insurance coverage, age, sex, etc. may be compared against other clients to generate certain groupings for subsequent targeted messaging or commercial offerings. Similarly, in case of appliance client interface 30, candidate appliance sensed or specified attributes, such as appliance model number, multimedia play-back capacity, entertainment preferences, usage pattern, budget allowance, schedule availability, etc. may be compared against other client to generate certain groupings. Upon candidate grouping classification, database 100 modules 104, 108 may be updated to reflect client membership accordingly.

Optionally, to provide network system client grouping scalability, when candidate client is determined not to be classifiable as analyzed, subject server 2 may modify group registry 108 to define set changes and create new super-group, group, or sub-group, as required by subject server.

Preferably, database registry 108 provides group classification with corresponding context mapping or topic relevance matching, thereby enabling directed matching for adaptive messages 86. Although such context mapping may be applied in case-specific manner, wherein specific rules or requirements for defining groups or clients having certain specified or sensed attributes are designated to receive targeted message broadcast, preferably, such context mapping may be achieved using less precise qualification scheme, such as fuzzy or statistical logical or topical association to generate list of possible candidates for targeted messaging. Upon completion of such context mapping, group registry 108 is updated. Additionally, context mapping scheme may be adapted to focus target candidates or reduce such directed client list for more precise marketing effect, preferably in response to real-time specified or sensed group or client attributes.

Figure 7:
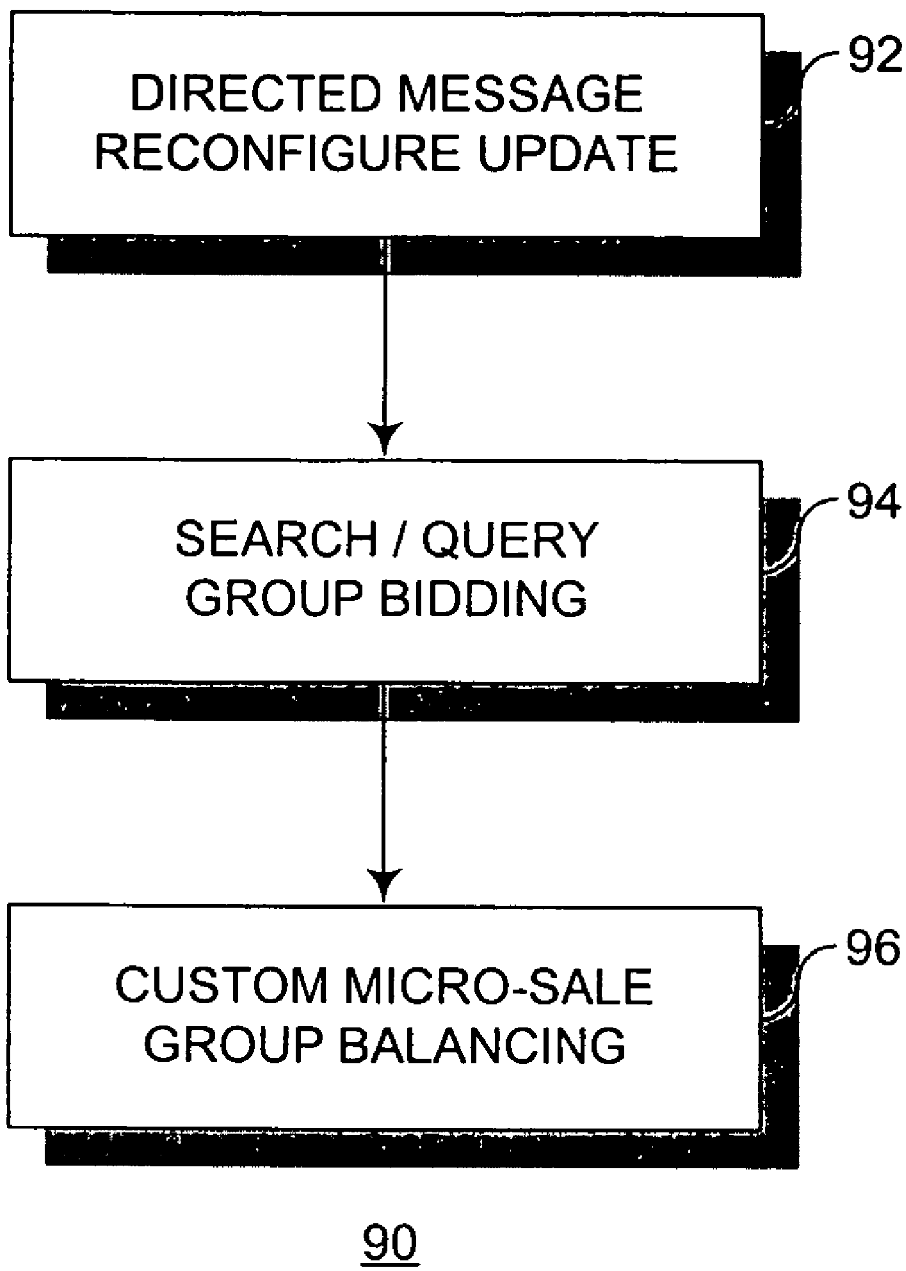
FIG. 7 is flow chart of operational steps for directed offering transaction according to present invention.

FIG. 7 flow chart shows directed offering transaction operation 90, wherein subject server 2 (or alternate network processor) generates and/or sources one or more directed or targeted message, which may include commercial, promotional, or marketing symbol, audio, text, still image, video, or other media content or signal for context-mapped or other designated clients within specified grouping(s). In particular, such directed messages may be downloaded from module 102, or other network source, and transmitted 92 through network 4 to designated client sites according to database 100 user client and grouping configurations and network connections specified in module 104, whereupon database 100 traffic operations module 106 is appropriately updated or reconfigured to reflect completed messaging.

Optionally, such directed messaging may be invoked by subject server 2 in response to one or more network searches or queries 92, for example, from other authorized server or client, or network search agent software application or process thereof, accessing group registry module 108 search interface to locate or identify one or more target groupings or clients therein, which qualify under certain specified or sensed attributes. Directed transactional messages 70 may be sent to targeted grouping(s), as well as client members therein, for prompt network download and display 70.

Furthermore, in auction style or similar bidding procedure, one or more such searching or querying network nodes or sources, or client members in particular grouping, may be designated or qualified to participate in on-line bidding or auction transaction, whereby highest price or other parameter bidder is provided specified merit rights or transaction.

In addition, when one or more such searching or querying network node or sources, or client members in particular grouping, is so designated or qualified, customized commercial terms, for example, for transacting so-called micro-sale or comparable limited per-use service billing 96 may be charged to such on-line customer according to actual network distribution or execution of transacted application service. In such micro-sale transaction, subject server 2 may prioritize access or directed messaging resources to targeted clients to achieve group balancing, whereby network computing performance, database resource access, and/or application or other service delivery are optimized.

Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. In a network comprising a server coupled to one or more clients, a method for directed on-line commerce comprising the steps of:

determining for each client one or more client attributes according to data received from one or more sensor interfaces, wherein the one or more client attributes determination is provided by a server, at least one sensor interface electronically accessing one or more client sensor coupled locally to an associated client for real-time monitoring or configuration thereof, each associated client being coupled locally to a particular client sensor, such particular client sensor being physically embedded in or electronically integrated with its associated client, one or more client sensor physically detecting one or more client attribute, thereby enabling such client sensor automatically to generate an electronic digital feedback or control signal for real-time monitoring or configuration of such client sensor;

classifying each client into a first client set according to the determined one or more client attributes; and directing one or more messages in response to the set classification, wherein the directed one or more messages is provided by the server to the one or more clients classified into the first client set.

2. The method of claim 1 wherein the one or more client attributes comprises a monitored location, a time value, one or more conditions, or an affiliation associated with one or more client selections.

3. The method of claim 1 wherein the step of classifying each client comprises comparing the one or more client attributes with another attribute stored in a memory.

4. The method of claim 1 wherein the one or more clients are classified in the first client set according to a determined substantial similarity or recognizable pattern.

5. The method of claim 1 further comprising the step of:

determining by a server a second attribute of each client;

classifying each client into the same first or a second client set according to the second attribute; and directing a second message by the server to the one or more clients classified in the second set.

6. The method of claim 1 wherein the directed one or more messages provided in response to the set classification comprises a commercial offering, the commercial offering comprising an application program, a still image, or a video stream.

7. A client for coupling to a server in a network, the client comprising:

an interface; a processor; and a sensor;

wherein the interface is accessible by a server coupled to a network, whereby the processor selectively provides a network access in response to a signal provided by the sensor, the sensor being electronically accessible for real-time monitoring or configuration, the sensor coupled locally to an associated client for physically detecting one or more client attributes, thereby enabling such sensor automatically to generate the signal for electronic digital feedback or control during real-time monitoring or configuration of the sensor, the interface classified in a set according to a data value of the sensor signal, and the interface receiving first network signal according to the classified set, the associated client being coupled locally to the sensor, the sensor being physically embedded in or electronically integrated with the associated client.

8. The client of claim 7 wherein the data value of the generated sensor signal comprises a monitored location, a time value, or a condition or an affiliation associated with the client.

9. The client of claim 7 wherein the generated sensor signal is stored in a database, and the interface is classified by comparing the generated signal with another stored data provided in the database.

10. The client of claim 9 wherein the generated sensor signal is compared with another generated signal to determine a substantial similarity or recognizable pattern.

11. The client of claim 7 wherein the processor provided the network access in response to a second signal generated by the sensor, and wherein the interface being classified in a second client set according to the second sensor signal, the interface being classified in a second set according to the second sensor signal, the interface receiving a second network signal according to the second set.

12. The client of claim 7 wherein the first network signal comprises a commercial offering comprising an application program, a still image, or a video stream.

13. The client of claim 7 wherein the sensor comprises a global positioning satellite system (GPS) receiver for determining the position of a client.

14. The client of claim 7 wherein the interface further comprises a web browser application for accessing the network.

15. The client of claim 14 wherein the network access through the web browser application is secured by the sensor determining a customer identification of user.

16. The client of claim 7 wherein the interface sends a transaction signal in response to the first network signal.

17. A networking method for coupling a plurality of nodes, the networking method comprising:

receiving one or more client attribute signals from a first node, at least one client attribute signal being generated electronically by one or more client sensor for real-time monitoring or configuration thereof, one or more client sensor coupled locally to an associated client for physically detecting one or more client attributes, thereby enabling such client sensor automatically to generate an electronic digital feedback or control signal for real-time monitoring or configuration of such client sensor, each associated client being coupled locally to a particular client sensor, such particular client sensor being physically embedded in or electronically integrated with its associated client;

transmitting the one or more attribute signals to a second node for classifying the first node in a group according to the one or more attribute signals;

receiving a message signal from the second node; and transmitting the message signal to one or more nodes classified in the group.

18. The networking method of claim 17 further comprising:

receiving a second attribute signal from a third node;

transmitting the second attribute signal to the second node for classifying the third node in the group according to the second attribute signal;

receiving a second message signal from the second node; and transmitting the second message signal to one or more nodes classified in the group.

* * * * *

US006963899C1

(12) EX PARTE REEXAMINATION CERTIFICATE (8684th)

United States Patent

Fernandez et al.

(10) Number: US 6,963,899 C1

(45) Certificate Issued: Nov. 22, 2011

(54) ADAPTIVE DIRECT TRANSACTION FOR NETWORK CLIENT GROUP

(75) Inventors: Dennis S. Fernandez, Atherton, CA (US); Irene Hu, Belmont, CA (US)

(73) Assignee: Dennis S. Fernandez, Atherton, CA (US)

Reexamination Request:
No. 90/010,397, Feb. 10, 2009

Reexamination Certificate for:

| | |
|---|---|
| Patent No.: | **6,963,899** |
| Issued: | **Nov. 8, 2005** |
| Appl. No.: | **09/952,285** |
| Filed: | **Sep. 14, 2001** |

Related U.S. Application Data

(62) Division of application No. 09/145,167, filed on Sep. 1, 1998.

(51) Int. Cl.
*G06F 15/16* (2006.01)

(52) U.S. Cl. .................. 709/203; 705/14.23; 705/14.39; 705/14.51; 705/14.73; 705/30; 707/999.001; 707/999.003; 707/999.01; 709/205; 709/218; 709/223

(58) Field of Classification Search ........................ None
See application file for complete search history.

(56) References Cited

To view the complete listing of prior art documents cited during the proceeding for Reexamination Control Number 90/010,397, please refer to the USPTO's public Patent Application Information Retrieval (PAIR) system under the Display References tab.

*Primary Examiner*—William H. Wood

(57) ABSTRACT

Internet-based software and associated database provide group analysis overlay to monitor client-server web traffic and provide direct marketing to client group. Client car, patient, office or school sensor and interface provides overlay attribute for database comparison to classify usage pattern, location, timing, or family for targeted messaging for enhanced service from server source. Database group registry tracks client classification and provides adaptive context mapping according to set attribute relative to targeted on-line transaction.

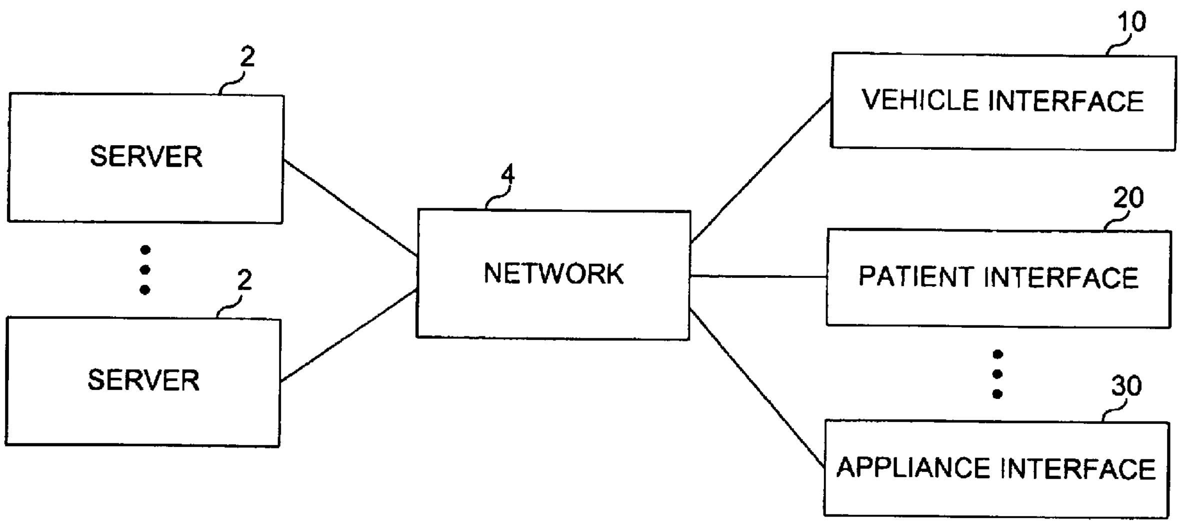

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 and 18 are cancelled.

* * * * *